A. F. SMITH.
BUTTER CUTTER.
APPLICATION FILED JAN. 10, 1922.

1,438,870.

Patented Dec. 12, 1922.
2 SHEETS—SHEET 1.

A. F. Smith, Inventor

A. F. SMITH.
BUTTER CUTTER.
APPLICATION FILED JAN. 10, 1922.
1,438,870.
Patented Dec. 12, 1922.
2 SHEETS—SHEET 2.
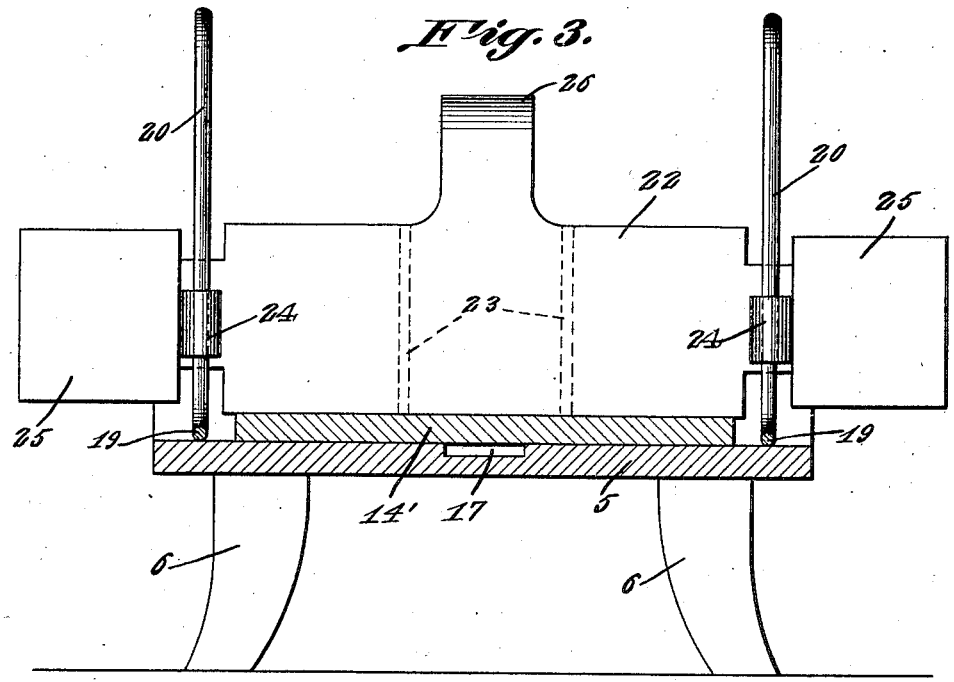
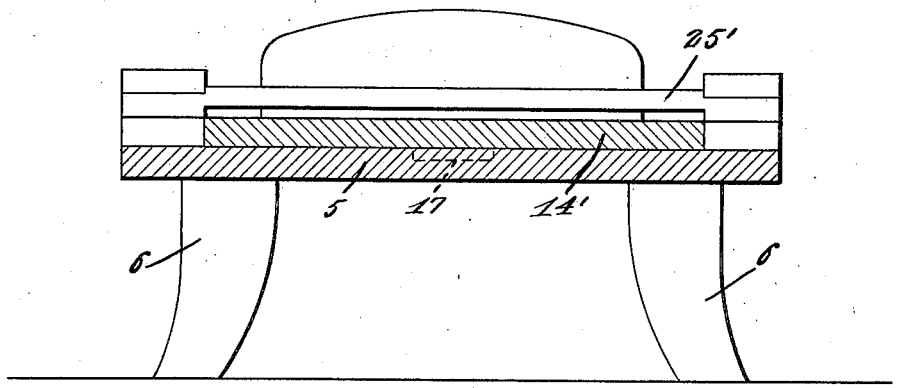
A. F. Smith, Inventor
By C. A. Snow & Co.
Attorney Patented Dec. 12, 1922.

1,438,870

UNITED STATES PATENT OFFICE.

ABRAM FREDRICK SMITH, OF ABERDEEN, WASHINGTON.

BUTTER CUTTER.

Application filed January 10, 1922. Serial No. 528,343.

*To all whom it may concern:*

Be it known that I, ABRAM FREDRICK SMITH, a citizen of the United States, residing at Aberdeen, in the county of Grays Harbor and State of Washington, have invented a new and useful Butter Cutter, of which the following is a specification.

This invention relates to combined butter containing dish and slicer, the primary object of the invention being to provide novel means for moving a block of butter to a point exteriorly of the container, whereby the same may be sliced or cut into individual portions.

Another object of the invention is to provide a novel form of blade, whereby upon a single movement thereof, the butter may be formed into a plurality of sections.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 3 is a sectional view taken on line 3—3 of Figure 1.

Figure 4 is a sectional view taken on line 4—4 of Figure 1.

Figure 1:
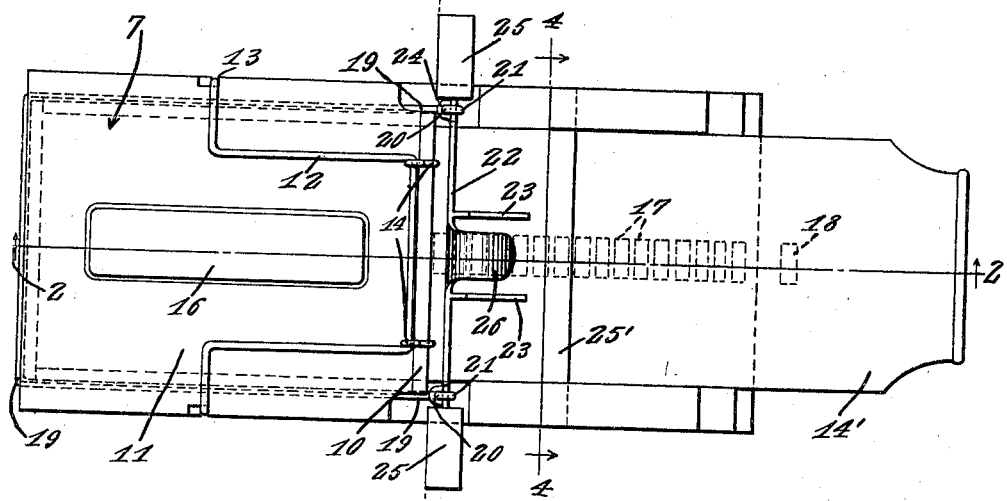
Figure 1 is a top plan view of a device constructed in accordance with the present invention.
Figure 2:
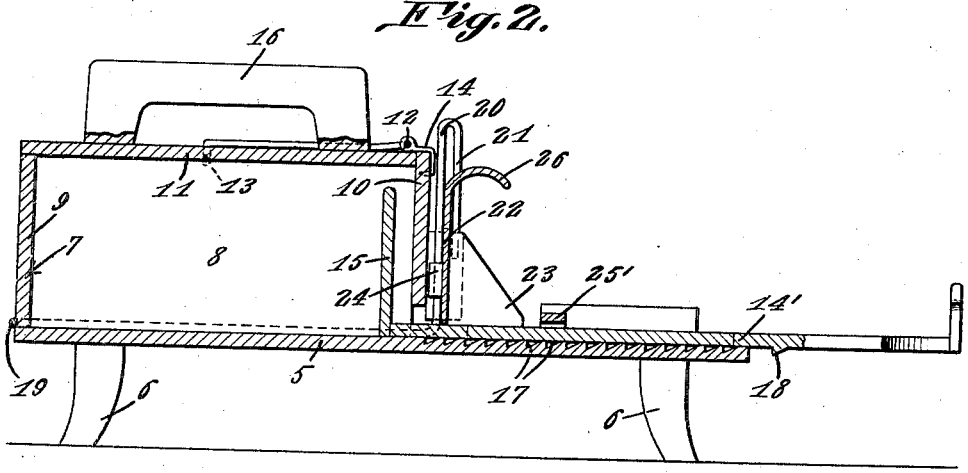
Figure 2 is a sectional view taken on line 2—2 of Figure 1.

Referring to the drawings in detail, the reference character 5 designates the base of the container, which may be formed of glass or other suitable material, legs 6 being provided for supporting the base in spaced relation with the surface on which the device is positioned.

Forming a part of the container and secured to the base 5 by any suitable means, is a rectangular housing 7 which is formed with side walls 8, end walls 9 and 10 respectively, and a removable cover 11.

The cover is hingedly connected with the end wall 10 as by means of the hinged member 12 that has connection with the cover as at 13, the hook members 14 being secured to the end wall 10 that provides a movable closure for the container proper. Secured to the cover 11 is a handle 16, by means of which the cover may be moved to a position to permit butter or like material to be positioned within the container.

As shown, the housing 7 is of a length less than the length of the base 5 so that the forward portion of the base will act as a rest for the movable bottom 14' forming an important feature of the invention, and on which the butter is supported. Formed at the rear of the movable bottom member 14' is a wall 15, which contacts with one end of a block of butter to move the same with the movable bottom member 14' when it is desired to move the butter from a point within the housing to a position to be cut by the movable knife, to be hereinafter more fully described.

Formed in the upper surface of the base 5, and disposed intermediate the width thereof are the notches 17 which cooperate with the tooth 18 to prevent movement of the movable bottom member 14' in a reverse direction, after the same has been moved to a position to be engaged by the cutting element.

Secured to the container at a point adjacent to the base of the housing 7 is a length of wire 19, which substantially embraces the lower portion of the housing 7 and has its forward ends extended upwardly as at 20 and downwardly as at 21, the ends 20 and 21 being disposed in spaced relation with each other to provide guideways at opposite sides of the housing 7 to accommodate the cutting element indicated at 22.

This cutting element 22 is in the form of a relatively wide blade provided with spaced blades 23 disposed adjacent to the central portion thereof, the blades 23 being however arranged in spaced relation with each other, so that when the cutting element is forced through a section of butter or the like, a plurality of individual portions will be formed thereby.

Secured to the cutting element 22 are the tubular members 24 designed to accommodate portions of the member 19 to guide the cutting element in its vertical movements to accomplish its purpose. At the ends of the cutting element 22 are the handles 25 which may be gripped by the person operating the cutting element for forcing the same through a portion of butter.

A stop indicated at 25' is supported by the base 5 and overlies the movable bottom member 14' to act as a guide for the movable bottom member 14', and at the same time provide means for contacting with one end of a block of butter to restrict movement of the bottom member 14' and act as a gauge to gauge the widths of the portions cut by the cutting element 22. An operating handle 26 is also formed on the cutting element 23 and provides means for moving the cutting element 22 vertically.

In the use of the device, assuming that a block of butter is positioned on the movable bottom member 14' and the housing 7 has been removed, the movable bottom member 14' is moved outwardly until one end thereof contacts with the member 25'. It is obvious that with a block of butter in this position, the cutting element 22 may be moved downwardly, cutting a portion of butter into a plurality of individual portions of equal sizes.

Having thus described the invention, what is claimed as new is:—

In a device of the character described, a container having a hinged closure at one end thereof, guideways at one end of the container, a vertically movable knife adapted to operate within the guideways, a movable bottom member adapted to move within the container, said bottom member adapted to move an article supported thereby to a point under the knife, means for restricting movement of the bottom member, and a gauge adapted to contact with the article supported on the bottom member to restrict movement of the bottom member in one direction.

In testimony that I claim the foregoing as my own, I have hereto affixed my signature in the presence of two witnesses.

ABRAM FREDRICK SMITH.

Witnesses:
   CHARLES ARTHUR FLANNIGAN,
   HERMAN OTTO POLARD.